United States Patent
Lee

(10) Patent No.: US 11,314,328 B2
(45) Date of Patent: *Apr. 26, 2022

(54) APPARATUS AND METHOD FOR ADAPTIVELY MAGNIFYING GRAPHIC USER INTERFACES ON DISPLAY

(71) Applicant: NHN Corporation, Gyeonggi-do (KR)

(72) Inventor: Dong Jin Lee, Gyeonggi-do (KR)

(73) Assignee: NHN CORPORATION, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/206,131

(22) Filed: Mar. 19, 2021

(65) Prior Publication Data

US 2021/0208677 A1 Jul. 8, 2021

Related U.S. Application Data

(63) Continuation of application No. 16/664,744, filed on Oct. 25, 2019, now Pat. No. 10,996,750.

(30) Foreign Application Priority Data

Oct. 31, 2018 (KR) ........................ 10-2018-0131735

(51) Int. Cl.
*G06F 3/01* (2006.01)
*G06F 1/16* (2006.01)
(Continued)

(52) U.S. Cl.
CPC ............ *G06F 3/013* (2013.01); *G06F 1/1626* (2013.01); *G06T 3/40* (2013.01); *H04N 5/2259* (2013.01); *G06F 3/048* (2013.01)

(58) Field of Classification Search
CPC ................................................... G06F 3/0482
See application file for complete search history.

(56) References Cited

U.S. PATENT DOCUMENTS 6,191,405 B1 * 2/2001 Mishima ................. G06T 3/608
250/208.1
9,645,642 B2 * 5/2017 Karakotsios ............ G06F 3/013
(Continued)

FOREIGN PATENT DOCUMENTS

CN 106488063 3/2017
CN 104995905 5/2019
(Continued)

OTHER PUBLICATIONS

Office Action dated Dec. 22, 2020 for Japanese Patent Application No. 2019-196331 and its English translation from Global Dossier.
(Continued)

*Primary Examiner* — Sepehr Azari
(74) *Attorney, Agent, or Firm* — Ladas & Parry, LLP

(57) ABSTRACT

A mobile device comprises a display panel configured to display a plurality of graphic user interfaces including one or more first type graphic user interfaces and/or one or more second type graphic user interfaces; one or more sensors configured to detect a position of a user; and one or more processors configured to: calculate a relative inclination of the display panel with respect to the position of the user based on the position of the user detected by the sensor, and change sizes of the first type graphic user interfaces among the plurality of graphic user interfaces based on the relative inclination of the display panel. The first type graphic user interfaces are pre-designated among the plurality of graphic user interfaces and stored in memory, and the processors are configured to magnify the sizes of the first type graphic user interfaces according to the relative inclination of the display panel.

18 Claims, 12 Drawing Sheets

(51) Int. Cl.
  *G06T 3/40*    (2006.01)
  *G06F 3/048*   (2013.01)
  *H04N 5/225*   (2006.01)

(56) References Cited

U.S. PATENT DOCUMENTS

| | | | |
|---|---|---|---|
| 10,019,140 B1* | 7/2018 | Bell | G06F 3/04883 |
| 10,275,020 B2* | 4/2019 | Cohen | G06F 3/012 |
| 2009/0262142 A1* | 10/2009 | Ferlitsch | G09G 5/00 |
| | | | 345/661 |
| 2009/0295832 A1* | 12/2009 | Takatsuka | G06F 3/0304 |
| | | | 345/659 |
| 2010/0192100 A1* | 7/2010 | Wu | G06F 3/04842 |
| | | | 715/834 |
| 2014/0118255 A1* | 5/2014 | Billerbeck | G06F 3/0304 |
| | | | 345/158 |
| 2014/0285418 A1* | 9/2014 | Adachi | G06F 3/04886 |
| | | | 345/156 |
| 2015/0082180 A1* | 3/2015 | Ames | G06F 3/04815 |
| | | | 715/738 |
| 2016/0085320 A1* | 3/2016 | Feinstein | H04L 67/02 |
| | | | 345/156 |
| 2017/0060381 A1* | 3/2017 | Hanada | G06F 3/0482 |
| 2017/0131793 A1* | 5/2017 | Wang | G06F 3/017 |
| 2017/0242646 A1* | 8/2017 | Lee | G06F 1/1686 |
| 2018/0260104 A1* | 9/2018 | Hanada | G06F 3/0482 |

FOREIGN PATENT DOCUMENTS

| | | |
|---|---|---|
| JP | 2014-191611 | 10/2014 |
| JP | 2016-35772 | 3/2016 |
| JP | 2016-146103 | 8/2016 |
| JP | 2017-49664 | 3/2017 |

OTHER PUBLICATIONS

Office Action dated Aug. 12, 2020 for U.S. Appl. No. 16/664,744 (now published as 2020/0133391).

Notice of Allowance dated Jan. 15, 2021 for U.S. Appl. No. 16/664,744 (now published as 2020/0133391).

Corrected Notice of Allowanced dated Mar. 10, 2021 for U.S. Appl. No. 16/664,744 (now published as 2020/0133391).

* cited by examiner

APPARATUS AND METHOD FOR ADAPTIVELY MAGNIFYING GRAPHIC USER INTERFACES ON DISPLAY

CROSS REFERENCE TO RELATED APPLICATION

This application is a continuation of U.S. patent application Ser. No. 16/664,744 filed on Oct. 25, 2019, which claims priority to Korean Patent Application No. 10-2018-0131735, filed on Oct. 31, 2018, which is hereby incorporated by reference for all purposes as if fully set forth herein.

BACKGROUND

Technical Field

The present disclosure generally relates to a method of adaptively magnifying a graphic user interface and a mobile device capable of adaptively magnifying a graphic user interface. More specifically, some embodiments of the present disclosure relate to a method for sensing the location of a user's eye and magnifying the size of the graphic user interface according to the relative inclination of the mobile device with respect to the user's eye, and a mobile device capable of performing the same.

Discussion of the Background

Various applications are installed on mobile devices such as smartphones, tablets and the like. When a user executes the installed applications, various services are provided through wireless communication networks such as Wi-Fi and mobile data network. A mobile device displays various types of graphic user interfaces through a display panel for the purpose of executing an application and providing the execution result. The user provides a command for an application and various user inputs to a processor of the mobile device through a graphic user interface, and then receives an execution result from the processor. Such a graphic user interface may include an application icon, various notification windows, and the like.

However, when the mobile device is placed at a considerable inclination from the user's gaze, the graphic user interface such as an icon and a notification window displayed on the display panel is observed as shrinking in a direction of the user's gaze.

The above information disclosed in this Background section is only for enhancement of understanding of the background of the inventive concept, and, therefore, it may contain information that does not form the prior art that is already known in this country to a person of ordinary skill in the art.

SUMMARY

Some exemplary embodiments may provide an apparatus, for example, but not limited to, a mobile device, configured to change or magnify a graphic user interface according to the relative inclination of the mobile device with respect to a user's gaze. Certain exemplary embodiments may also provide a method for changing or magnifying the graphic user interface according to the relative inclination of the mobile device with respect to the user's gaze.

Additional aspects will be set forth in the detailed description which follows, and, in part, will be apparent from the disclosure, or may be learned by practice of the inventive concept.

Various exemplary embodiments may provide a mobile device including a display panel; a sensor for detecting a position of the user; a relative inclination calculator calculating a relative inclination of the display panel with respect to the user using the position of the user detected by the sensor; and a graphic user interface magnification processor configured to magnify the size of the first type of graphic user interface among a plurality of graphic user interface s displayed on the display panel based on the relative inclination.

The sensor may include an eye detection sensor detecting a position of the user's eye with respect to the display.

The first type of graphic user interface may be pre-designated among the plurality of graphic user interfaces and stored in a memory.

The graphic user interface magnification processor may be further configured to magnify the size of the first type graphic user interface according to the relative inclination.

The eye detection sensor may detect the position of the user's eyes, and the relative inclination calculator may be configured to calculate the relative calculation using the position of the user's eye.

The relative inclination calculator may calculate an angle between a first line and a second line as the relative inclination, the first line is a line segment connecting a predetermined position of the display panel and the position of the user's eye, and the second line is perpendicular to a main display surface of the display panel.

The graphic user interface magnification processor may be configured to determine an magnified display area on which the first type of graphic user interface is to be displayed, based on the calculated relative inclination, magnify the first type of graphic user interface according to the calculated relative inclination and display the magnified first type of graphical user on the magnified display area.

The graphic user interface magnification processor may be further configured to compare the relative inclination with a threshold value, and magnify the first type of the graphic user interface only if the relative inclination is above the threshold value.

When the inclination is determined to be greater than or equal to the threshold value, the graphic user interface magnification processor may determine whether a second type of graphic user interface other than the first type of graphic user interface is displayed on the magnified display area, and replace the second type of graphic user interface with the first type of graphic user interface when the second type of graphic user interface is displayed on the magnified display area.

As an alternative, when the inclination is determined to be greater than or equal to the threshold value, the graphic user interface magnification processor may determine whether a second type of graphic user interface other than the first type of graphic user interface is displayed on the magnified display area, deactivate the second type of graphic user interface, and display the first type of graphic user interface on the magnified display area by overlaying the second type of graphic user interface with the first type of graphic user interface when the second type of graphic user interface is displayed on the magnified display area.

The graphic user interface magnification processor may restore the second type of graphic user interface to the magnified display area when the relative inclination is restored to a threshold value or less.

The graphic user interface magnification processor may be further configured to determine an area of the display panel closest to the position of the user's eye as the magnified display area.

Various exemplary embodiments may provide a method for adaptively magnifying a graphic user interface including detecting a location of a user's eye by the sensor; receiving the position of the user's eye from the sensor and calculating a relative inclination of the display panel with respect to the position of the user's eye using the position of the user's eye by the relative inclination calculator; and receiving the relative inclination from the relative inclination calculator and magnifying the first type graphic user interface based on the relative inclination by the graphic user interface magnification processor.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
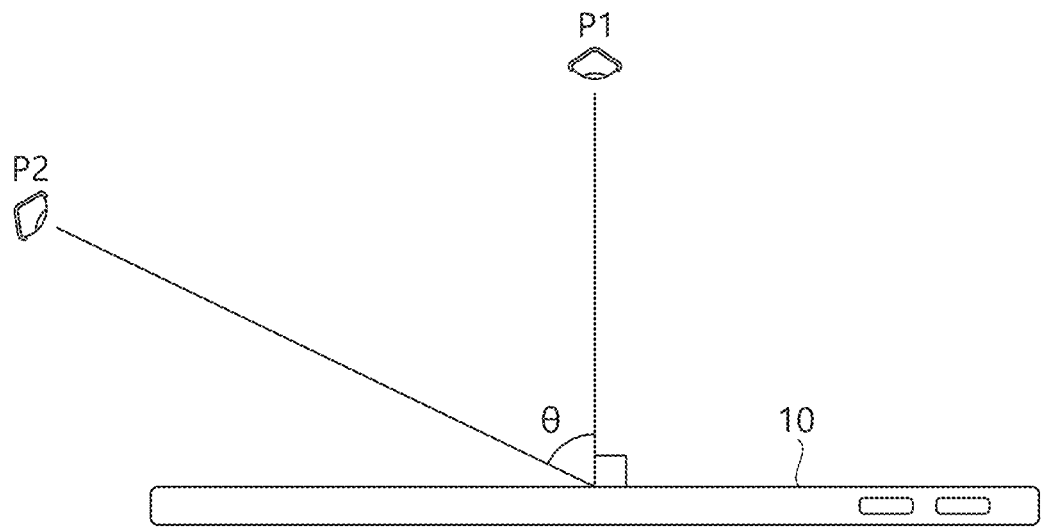
FIG. 1 illustrates a change in relative inclination of a display panel of a mobile device with respect to user's gaze.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and apparatus are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element or layer, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
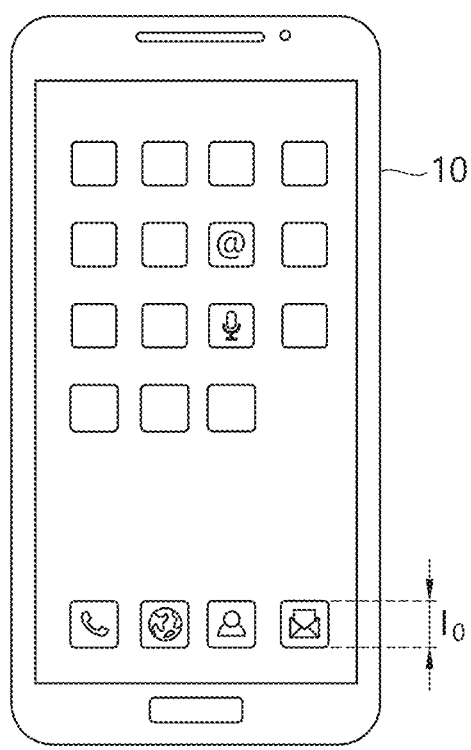
FIG. 2 illustrates an example of a mobile device viewed by a user from the position of P1 of FIG. 1.
Figure 3:
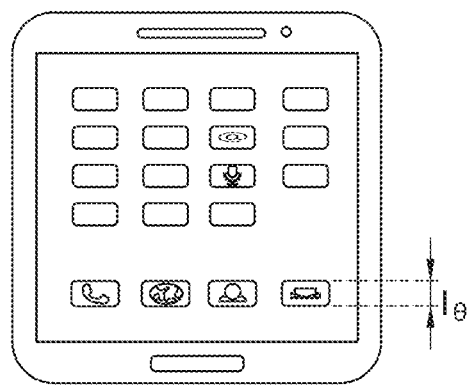
FIG. 3 illustrates a conventional mobile device viewed by a user from the position of P2 of FIG. 1.

FIG. 1 illustrates a change in relative inclination of a display panel of a mobile device with respect to user's gaze, FIG. 2 illustrates an example of a mobile device viewed by a user from the position of P1 of FIG. 1, and FIG. 3 illustrates an example of a mobile device viewed by a user from the position of P2 of FIG. 1.

In FIG. 1, θ is an angle (hereinafter, referred to as 'relative inclination') formed by a user's gaze with respect to a normal of the display panel in the conventional mobile device, P1 is the right front of the display, that is, the observation position where θ is 0, and P2 is the longitudinal oblique viewing position of the mobile device.

Referring to FIG. 1 to 3, the length of the icons is $l_0$ when viewed from P1 which is the right front of the display panel, but as the relative inclination θ increases, the length is reduced in the vertical direction and it becomes $l_θ$ considerably smaller than 1 at the position of P2. Therefore, in order to execute the application or check the contents of the notification window, the user may have to change his posture to stare at the front of the display panel or to pick up the mobile device.

Figure 4:
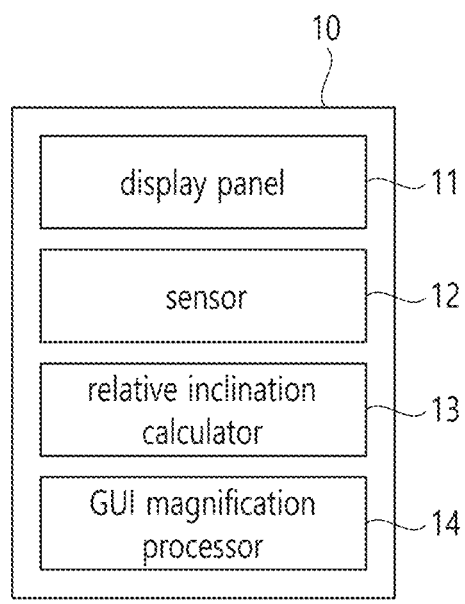
FIG. 4 is a block diagram illustrating a schematic structure of a mobile device according to an embodiment of the present disclosure.

In particular, when it is difficult to change the posture or to pick up the mobile device, such as during a meeting or working, it is difficult to check the notification content or run the application FIG. 4 is a conceptual block diagram illustrating a schematic structure of a mobile device according to an embodiment of the present disclosure.

According to the embodiment, the mobile device 10 may include a display panel 11, one or more sensors 12, a relative inclination calculator (or calculating unit) 13, and a graphic user interface (GUI) magnification processor (or processing unit) 14.

The mobile device 10 includes a processor and performs various functions in connection with a wireless data communication network such as Wi-Fi, a mobile communication network, and the like. The mobile device 10 may be, for example, but not limited to, one of a smartphone, a tablet, a personal digital assistant (PDA), a smart device including a smart watch and the like.

Various applications are installed in the mobile device 10, and various types of graphic user interfaces are provided for executing of applications, receiving a user input, and displaying the application execution result.

The GUI includes an icon for executing an application, a graphic qwerty keyboard interface for user input, a graphic button for receiving a user's touch input, and various notification windows including a window for receiving a message or notification.

The display panel 11 displays the GUIs and the execution result of the application installed in the mobile device 10. The display panel 11 may include a touch panel that detects a touch of a user's finger or a stylus pen.

One or more sensors 12 detect an inclination of the display panel 11. The sensors 12 may include a gravity sensor or a gaze detection sensor. The gravity sensor detects the direction of gravity and calculates an angle formed between the display surface of the mobile device 10 (such as the display panel 11) and the direction perpendicular to the ground surface, that is, the inclination of the mobile device 10 with respect to the gravity direction. The gaze detection sensor detects the user's eyes using an image pickup device, for example, but not limited to, a camera, and detects the position of the user's eyes.

The relative inclination calculator 13 receives a value detected from the sensor 12 or a signal indicative of the inclination of the display panel 11, and calculates a relative inclination between the display and the user's gaze. The relative inclination may be calculated based on the center portion of the display panel 11. For example, the relative inclination calculator 13 may be configured to calculate, as a relative inclination, an angle between a line from a position of the user's eye detected by the gaze sensor to the center of the display panel and a normal direction of the display panel (e.g. a direction perpendicular to the display panel 11).

The graphic user interface magnification processor 14 magnifies the size of the graphic user interface on the basis of the relative inclination calculated by the relative inclination calculator 13. However, it may not be necessary that all of the graphic user interfaces displayed on the display panel are magnified. It is preferable to magnify only one or some of the graphic user interfaces that need to be magnified to enable the user's operation even when the mobile device 10 is inclined with respect to the user's gaze. For example, while the smartphone is set down during a meeting, it is unlikely that a game or video will be played, but it is necessary to check a received message or check a contact. Therefore, when it is detected that the display panel 11 is inclined with respect to the user's gaze, it is preferable to configure the mobile device 10 to magnify only specific or certain graphic user interfaces. Hereinafter, for illustration purposes, the graphic user interface to be magnified will be referred to as a "first type" graphic user interface, and the graphic user interface not to be magnified will be referred to as a "second type" graphic user interface.

The first type graphic user interface may be selected by the user. In other words, the user may designate an icon, a notification window, or the like that needs to be operated while viewing the mobile device at an oblique angle, as the first type graphic user interface. The graph user interfaces designated as the first type graphic user interface by the user is stored in memory. For example, a user may designate an icon of an email application, a call icon, a message icon, a voice recorder icon, etc. as the first type graphic user interface. The designated icons are magnified even in the oblique viewing state so that the user can easily view, touch (select) and manipulate them without picking the mobile device up. Similarly, the user may designate the window for receiving a message or notification as the first type graphic user interface. In this case, since the window for receiving the message or notification is magnified when the smartphone is placed at an oblique angle to the user's gaze, the user can check the contents of the message without changing the posture or picking up the smartphone.

The magnification direction of the first type graphic user interface may vary depending on a state, position and/or angle where the mobile device is placed. For example, when the mobile device is placed obliquely in a length direction with respect to the user's line of sight, the first type graphic user interface is magnified in the length direction, i.e., the length of the first type graphic user interface is magnified. Conversely, when the mobile device is placed obliquely in a width direction with respect to the user's line of sight, the first type graphic user interface magnified in the width direction, i.e., the width of the first type graphic user interface is magnified. If the mobile device is placed obliquely in both of the length and width direction with respect to the user's line of sight, the first type graphic user interface magnified is magnified in a dominated one of the length and width directions, or both directions. For example, when a line that the user's gaze line is projected on a surface of the display panel 11 makes ten (10) degrees with respect to the length of the mobile device 10, shrinking in the length direction is dominant over shrinking in the width direction, so that the graphic user interface is magnified in the length direction. On the other hand, when a line that the user's gaze line is projected on the surface of the display panel 11 makes seventy (70) degrees with respect to the length of the mobile device 10, shrinking in the width direction is dominant over shrinking in the length direction, so that the graphic user interface is magnified in the width direction.

The graphic user interface magnification processor 14 may determine the magnification ratio of the first type graphic user interface according to the relative inclination calculated by the relative inclination calculator 13. Since the size of the graphic user interface decreases as the relative inclination (that is, the angle between the normal of the display panel and the user's line of sight) increases, the graphic user interface magnification processor 14 may be configured to increase the magnification of the first type graphic user interface as the relative inclination increases. In this case, it is preferable that the magnification ratio is determined such that the size of the first type graphic user interface observed from the sensed user's eye position is the same as the size observed when the relative inclination is zero (right front). In other words, it is preferable to determine the magnification so that the size of the icon or the notification window recognized by the user does not change even when the relative inclination changes. The magnification of the first type graphic user interface may be determined experimentally in advance. For example, the size of the icon or the notification window may be photographed at various relative inclinations, and the magnification ratio at each relative inclination may be determined by magnifying it until it becomes the size observed from the right front. When the magnification ratio is determined experimentally, the magnification ratio is determined by experiment only for a few relative inclinations, and the magnification ratio for the untested relative inclinations may be determined by interpolation. The experimentally obtained magnification ratio and various parameters for interpolation may be stored in a memory in the form of a look-up table (LUT) and then read out for use.

The graphic user interface magnification processor 14 magnifies the first type graphic user interface by applying the determined magnification ratio. The length l' in the magnification direction of the magnified first type graphic user interface is as follows.

$$l' = M * l_0 \qquad \text{Equation (1)}$$

$l_0$ is the length in the magnification direction of the first type graphic user interface before magnification, and M is the determined magnification ratio.

As another example, the magnification ratio can be calculated by approximation. Since the size (e.g. horizontal or vertical length) of the icon or notification window is considerably smaller than the distance to the user's eye, when the relative inclination is θ, the length of the first type graphic interface viewed by the user may be expressed by an approximation formula below.

$$l\theta = l_0 * \cos\theta \qquad \text{Equation (2)}$$

$l_0$ is the length of the first graphic user interface viewed from right front, and $l_\theta$ is a length of the first type graphic user interface observed at the position where the relative inclination is θ (see FIG. 3).

Since the cosine function is a decreasing function where θ is zero to ninety (0 to 90) degrees, it can be seen that as the relative inclination increases, the size of the first type graphic user interface decreases. Therefore, the magnification ratio M for magnifying the size of the first type graphic user interface may be determined as below.

$$M = 1/\cos\theta \qquad \text{Equation (3)}$$

The magnification of Equation (3) is merely an example derived using the simplest approximation model in which the projection line of the user's gaze to the display surface is parallel with the length (vertical) or width (horizontal) direction and the relative inclination is applied to the entire display area. The magnification may be calculated by more sophisticated mathematical models. For example, icons displayed in an area close to the user are less reduced than icons displayed in an area far from the user. Therefore, the relative inclination may be calculated for each area of the display panel, and different magnification ratio may be calculated for each area.

The graphic user interface magnification processor 14 may be configured to compare the relative inclination with a predetermined threshold and to magnify the first type graphic user interface only when the relative inclination is greater than or equal to the threshold. This is because the magnification is unnecessary if the user's operation is easy even if the first type graphic user interface is reduced. The threshold value is determined in consideration of the reduction in the operation accuracy due to the shrinking of the graphic user interface. The threshold may be set in various ways in consideration of the original size of the graphic user interface, the sensitivity of the touch panel, the user's skill, and the like. In general, if the horizontal or vertical length of the graphic user interface is reduced to less than half, the accuracy of manipulation may get worse. Thus, the threshold may be the relative inclination at which the size (horizontal or vertical length) of the graphic user interface is reduced in half. Such thresholds can be determined by experiment or by mathematical models. For example, according to the model of Equation (3) described above, the threshold at which the size (horizontal or vertical length) of the graphic user interface is reduced in half is 60 degrees.

Since the size of the display panel 11 is limited, the upper limit of the magnification ratio is determined by the display size. The upper limit of the magnification ratio may be a value obtained by dividing the length of the display in the magnification direction by the length of the first type graphic user interface in the magnification direction. For example, when the magnification direction is the vertical direction (e.g. the length of the mobile device 10) of the display, the upper limit of the magnification ratio for an icon is the ratio of the vertical length of the display to the vertical length of the icon.

The graphic user interface magnification processor 14 magnifies the first type graphic user interface according to the determined magnification ratio and displays the magnified first type graphic user interface on the display panel 11. In one example, the magnified first type graphic user interface may be magnified and displayed in its original position. In another example, the magnified first type graphic user interface may be displayed in a predetermined area different from the original position. As described above, in a region closer to the user's eye, since the shrinking of the graphic user interface is relatively small, it is advantageous that the same size of the graphic user interface can be observed by the user even with a smaller magnification ratio. Therefore, the graphic user interface magnification processor 14 is preferably configured to display the magnified first type graphic user interface in an area close to the user. For example, when it is detected that the user's eyes are close to the bottom of the mobile device 10 such as the smartphone, the graphic user interface magnification processor 14 displays the magnified first type graphic user interface at the bottom end of the display panel 11. On the other hand, if it is detected that the user's eyes are close to the upper end of the smartphone, the graphic user interface magnification processor 14 displays the magnified first type graphic user interface on the upper side of the display panel 11. In this case, if the display panel is inverted up and down, the graphic user interface magnification processor 14 may process the first type of graphic user interface to be inverted up and down for display.

When the magnified first type graphic user interface is displayed in an area close to the user of the display panel 11 (hereinafter referred to as an "magnified display area"), if a second type graphic user interface, that is not an object to be magnified, occupies the magnified display area, it is difficult to display the first type graphic user interface in the magnified display area. Accordingly, the graphic user interface magnification processor 14 may be configured to determine whether the second type graphic user interface is arranged in the magnified display area. If it is determined that the second type graphic user interface is arranged in the magnified display area, the graphic user interface magnification processor 14 deactivates the second type graphic user interface arranged in the magnified display area and overlays the magnified first type graphic user interface to display the magnified first type graphic user interface in the magnified display area. Alternatively, if it is determined that the second type graphic user interface is arranged in the magnified display area, the graphic user interface magnification processor 14 stops displaying the second type graphic user interface in the magnified display area and displays the magnified first magnified first type graphic user interface at the region where the second type graphic user interface was displayed. When the relative inclination becomes less than the threshold value, the magnification mode is deactivated or canceled and the interface magnification processing unit 14 displays the second type graphic user interface, which was deactivated or not displayed during the magnification mode, at the original position in the magnification display area.

Meanwhile, each of the relative gradient calculator 13 and the graphic user interface magnification processor 14 may be hardware, software, or a combination of hardware and software configured to perform the above-described processing. For example, the relative inclination calculation unit 13 may include software including computer-readable instructions necessary for processing the signal reception function from the sensor, calculating the relative inclination using the received signal, and the like, and a processor of the mobile device 10 performing functions corresponding to each of the instructions. Similarly, the graphic user interface magnification processor 14 may include software including computer-readable instructions necessary for receiving the relative inclination value from the relative inclination calculator 13, determining the magnification ratio by using the received relative inclination value, magnifying the first type graphic user interface, determining the display area, deactivating or not displaying the second type of graphic user interface. Software includes instructions for performing functions, and a processor of the mobile device 10 performs functions corresponding to each of the instructions. In this case, the software constituting the relative gradient calculator 13 and the graphic user interface magnification processor 14 may be installed in the mobile terminal 10 in a form of an application. In addition, the relative gradient calculation unit 13 and the graphic user interface magnification processor 14 may be independent software and hardware, or may be integrated into one software and hardware, or may be distributed by several software and hardware each of which is configured to perform specific function(s).

Hereinafter, some exemplary embodiments of magnifying the graphic user interface in the above-described mobile device of the present disclosure will be described in detail with reference to FIGS. 5 to 11.

Figure 5:
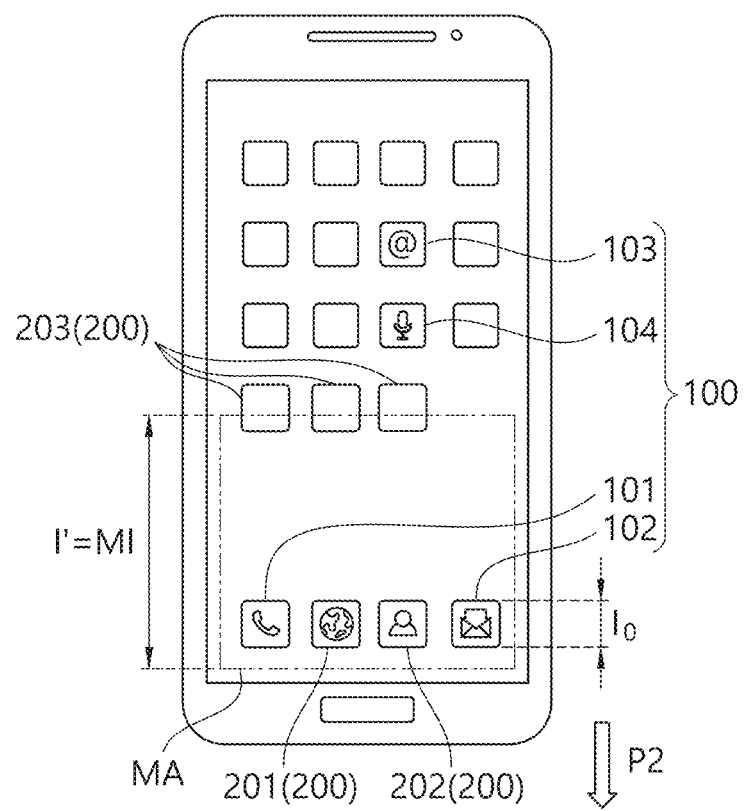
FIG. 5 illustrates an example of a display state of a mobile device before a magnification process is performed for a first type graphic user interface.

FIG. 5 illustrates an example of a display state of a mobile device before a magnification process is performed for a first type graphic user interface.

A plurality of application icons are displayed on the display panel 11 of the mobile device 10. The icons include first type icons 100 to be magnified and second type icons 200 not to be magnified. As described above, the first type of icons 100 and the second type of icons 200 may be designated by a user or by an initial setting. In the example of FIG. 5, a voice call icon 101, a text message icon 102, an email icon 103, and a recorder icon 104 are designated as the first type icons 100. On the other hand, the Internet icon 201, the messenger icon 202 and some application icons 203 are designated as the second type icons 200.

According to an embodiment of the present disclosure, when the angle formed by the user's gaze and the normal of the display panel (i.e., the relative inclination) is less than the threshold value, the icon may not be magnified. Therefore, if it is determined that the relative inclination at the position P2 of the user is less than the threshold value, the interface magnification processing unit 14 does not perform the operation of magnifying the icons and maintains the same display status as shown in FIG. 5.

Figure 6:
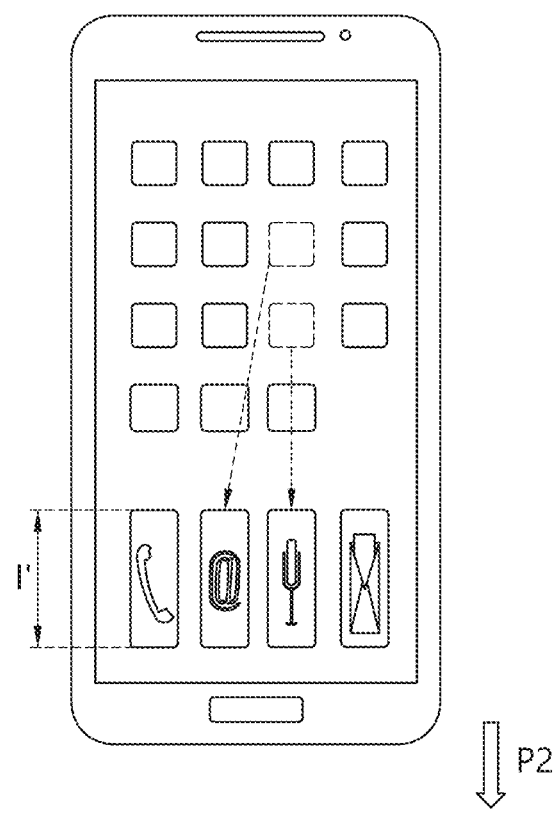
FIG. 6 illustrates a display state when a magnification process has been performed for a first type graphic user interface according to an embodiment of the present disclosure.
Figure 7:
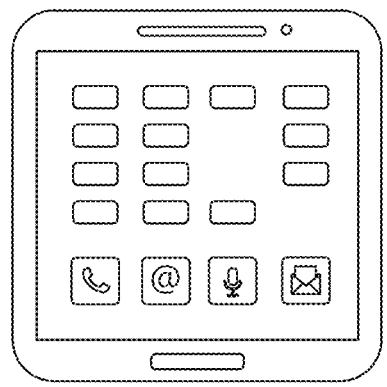
FIG. 7 illustrates the mobile device of FIG. 6 viewed by a user from the position P2 of FIG. 1.

FIG. 6 illustrates an example of a display state when a magnification process has been performed for a first type graphic user interface according to an embodiment of the present disclosure, and FIG. 7 illustrates the mobile device of FIG. 6 viewed from P2 of FIG. 1.

As described above, when the relative inclination calculated by the relative inclination calculator 12 is equal to or greater than the threshold value, the graphic user interface magnification processor 14 magnifies the first type icon 100. Meanwhile, as described above, according to the preferred embodiment, the graphic user interface magnification processor 14 may be configured to display the magnified first type graphic user interface in an area close to the user of the display panel 11. In the example of FIG. 5, since the user's position P2 is located out of the lower end of the mobile device 10, the graphic user interface magnification processor 14 sets the magnified display area to the lower end of the display close to the user position P2. Next, the graphic user interface magnification processor 14 calculates the magnification ratio M in accordance with the calculated relative inclination. The calculation method of the magnification M is described above. As described above, the magnification ratio is applied in a direction of the component, which is parallel to the display surface, of the user's gaze vector. In the example of FIG. 5, the orientation of this component coincides with the longitudinal direction of the display panel 11, so the icons of the first type are magnified in the longitudinal direction of the display panel 11. The graphic user interface magnification processor 14 calculates the length l' of the magnified icon by applying the calculated magnification ratio M, and determines the magnified display area MA corresponding thereto. More specifically, the graphic user interface magnification processor 14 multiplies the length $l_0$ of the original icon by the magnification ratio M to calculate l', and sets the magnified display area MA to the area corresponding to the length of the magnified first type icon 100. In this case, the graphic user interface magnification processor 14 may be configured to arrange a first type icon, which was not present in the determined magnified display area MA, in the magnified display area MA. In the example of FIG. 5, since the e-mail icon 103 and the recording icon 104 are originally disposed out of the magnified display area MA, the graphic user interface magnification processor 14 changes the position of the first type icons 103 and 104 to display them within the magnified display area MA. Meanwhile, as described above, the graphic user interface magnification processor 14 may determine whether the second type of icon 200 exists in the magnified display area MA, and deactivate the second type icon 200 arranged in the magnified display area MA. In the example of FIG. 5, the second type icons, e.g., the internet icon 201, the messenger icon 202, and three other application icons 203 are partially or entirely arranged in the magnified display area MA. Therefore, the graphic user interface magnification processor 14 processes to set these second types of icons 201, 202, and 203 in an inactive state so as not to respond to user input such as a touch.

Subsequently, as shown in FIG. 6, the graphic user interface magnification processor 14 magnifies and displays the first type icons 101 to 104 in the magnified display area MA. In this case, as described above, the magnified first type icons 101 to 104 may be overlaid on the deactivated second type icons 201, 202, and 203 in the magnified display area MA for displaying.

When the user's eye located at P2 observes the mobile device 10 after the magnification process is performed as shown in FIG. 6, the user may look as shown in FIG. 7. More specifically, since the first type icons 100 are magnified and displayed at the lower end of the display panel 11 closest to the user, the user can easily recognize and manipulate the first type icons 100 even when the mobile device 10 is viewed at an oblique angle.

Figure 8:
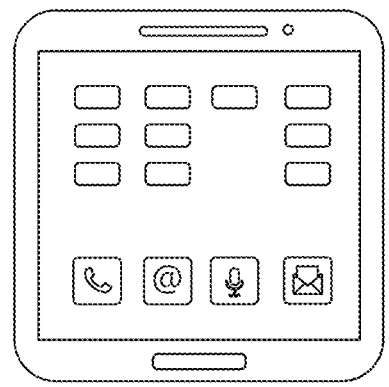
FIG. 8 illustrates an example of a mobile device viewed by a user from the position P2 of FIG. 1, magnifying a first type of graphic user interface according to another embodiment of the present disclosure.

FIGS. 6 and 7 illustrate the embodiment in which the second type icons 200 disposed in the magnified display area MA are inactivated and the first type icons 100 are displayed by overlay. Alternatively, it is also possible to replace the second type icons 200 with the first type icons 100 without displaying the second type icons 200. FIG. 8 illustrates an example of a mobile device viewed from P2 of FIG. 1, magnifying the first type of graphic user interface according to the alternative embodiment. As shown in FIG. 8, the graphic user interface magnification processor 14 may not display the second type icons 201, 202, and 203 partially or entirely arranged in the magnified display area MA as shown in FIG. 5.

Additionally, the first type graphic user interface may include a notification window.

Hereinafter, an example of magnifying a notification window according to an embodiment of the present disclosure will be described with reference to FIGS. 9 to 11.

Figure 9:
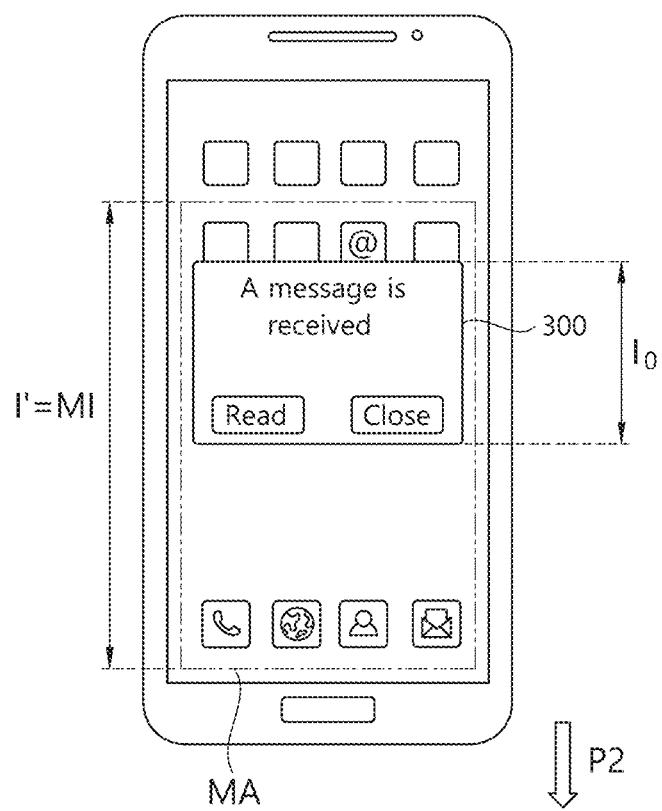
FIG. 9 illustrates an example of a mobile device displaying a message alarm window before a magnification process is performed.
Figure 10:
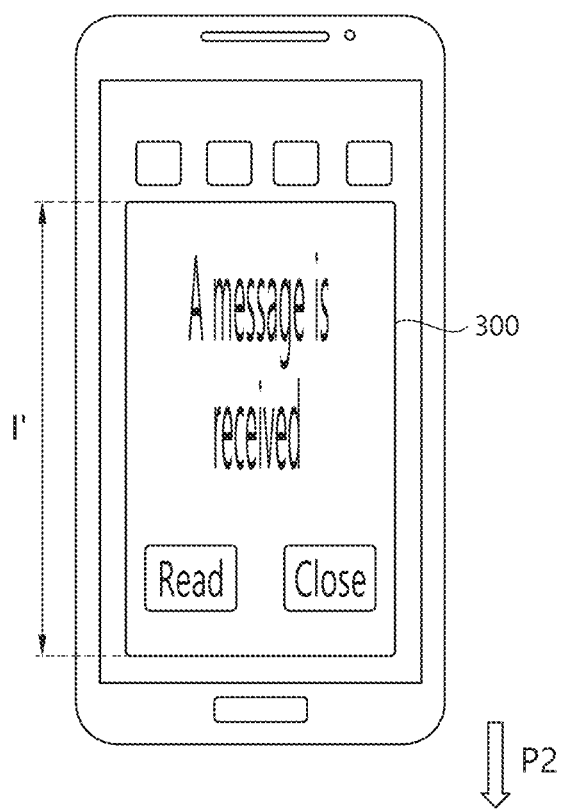
FIG. 10 illustrates an example of a mobile device displaying a magnified message alarm window according to an embodiment of the present disclosure.
Figure 11:
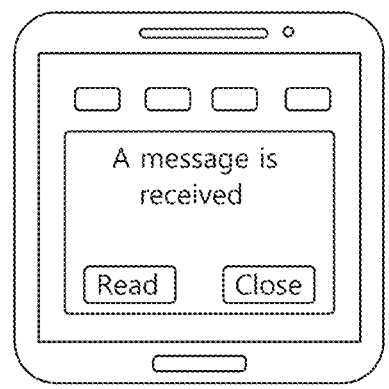
FIG. 11 illustrates an example of a mobile device of FIG. 10 viewed by a user from the position P2 in FIG. 1.

FIG. 9 illustrates an example of a mobile device displaying a message alarm window before a magnification process is performed, FIG. 10 illustrates an example of a mobile device displaying a magnified message alarm window according an embodiment of the present disclosure, and FIG. 11 illustrates an example of a mobile device of FIG. 10 viewed by an user from the position P2 in FIG. 1.

As described above, when the angle formed by the user's gaze and the normal of the display panel 11, i.e., the relative inclination, is less than the threshold value, a message notification window 300 may not be magnified. Therefore, if it is determined that the relative inclination at the position P2 of the user is less than the threshold value, the interface magnification processing unit 14 does not magnify the message notification window 300 and maintains the same display status as shown in FIG. 9.

When the relative inclination calculated from the relative inclination calculator 12 is equal to or greater than the threshold value, the graphic user interface magnification processor 14 magnifies the message notification window 300. Meanwhile, as described above, the graphic user interface magnification processor 14 may be configured to display the magnified message notification window 300 in an area close to the user of the display panel 11. In the example of FIG. 9, since the user's position P2 is located out of the lower end of the mobile device 10, the graphic user interface magnification processor 14 sets a magnified display area MA to the lower end of the display close to the user position P2. Next, the graphic user interface magnification processor 14 calculates the magnification ratio M in accordance with the calculated relative inclination. The method of calculating the magnification M is described above. As described above, the magnification ratio is applied in a direction of the component, which is parallel to the display surface, of the user's gaze vector. In the example of FIG. 9, the direction of this component coincides with the longitudinal direction of the display panel 11, so the message notification window 300 are magnified in the longitudinal direction of the display panel 11. The graphic user interface magnification processor 14 calculates the length of the magnified message notification window 300 by applying the calculated magnification ratio M to the original length $l_0$, and determines the magnified display area MA corresponding thereto. More specifically, the graphic user interface magnification processor 14 multiplies the original length $l_0$ of the message notification window 300 by the magnification ratio M, and calculates l', and sets the magnified display area MA to the area corresponding to the length of the magnified message notification window 300.

Subsequently, as illustrated in FIG. 10, the graphic user interface magnification processor 14 displays the magnified message notification window 300 in the magnified display area MA. In this case, the processing of the second type icon in the magnified display area MA may be performed in the same manner as described in the magnified display of the first type icon. More specifically, when the message notification window 300 is magnified, the graphic user interface magnification processor 14 deactivates the second type icon that was arranged in the magnified display area MA and overlays the message notification window 300 on the second type icons 200 for displaying the magnified message notification window 300, or the graphic user interface magnification processor 14 stops displaying the second type icons 200 and replaces the second type icons 200 with the magnified message notification window 300.

FIGS. 5 to 11 illustrate examples where a user's gaze coincides with a longitudinal direction (e.g. a length direction) of the mobile device 10, but the present disclosure may be applied to another case where the user's gaze coincides with a horizontal direction (e.g. a width direction) of the mobile device 10. In this case, the magnified display area MA is close to the user in the horizontal direction of the mobile device 10, and the first type graphic user interface is magnified in the horizontal direction. In addition, the first type graphic user interface may be rotated in accordance with the direction of the user's gaze to facilitate the user's visual recognition.

Hereinafter, a method for adaptively magnifying a graphic user interface performed by the mobile device will be described with reference to FIGS. 4 to 12.

Figure 12:
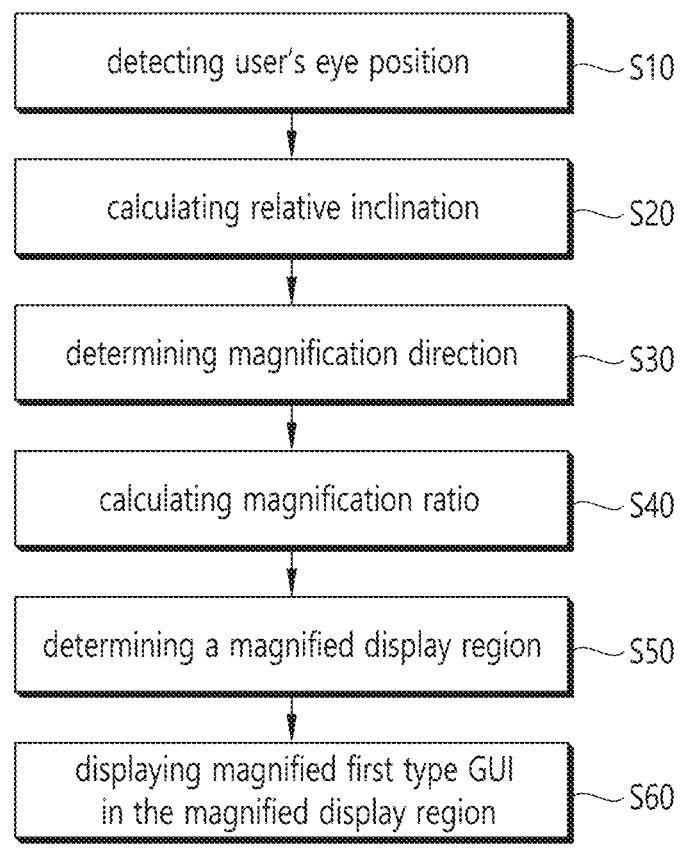
FIG. 12 is a flow chart illustrating a method for adaptively magnifying a graphic user interface of a mobile device according to an embodiment of the present disclosure.

FIG. 12 is a flow chart illustrating a method for adaptively magnifying a graphic user interface of a mobile device according to an embodiment of the present disclosure.

First, one or more sensors 12 of the mobile device 10 detect the user's eye location or position (S10). Given that the detection of the sensor and the user position has been described above, the detail of the step S10 will be skipped. The sensor 12 transmits the detected user position of the user's eye or a signal indicative of the position of the user's eye to the relative inclination calculator 13.

Subsequently, the relative inclination calculator 13 of the mobile device 10 calculates the relative inclination of the mobile device 10 with respect to the gaze of the user based on the user's eye position received from the sensor 12 (S20). Since the definition of the relative inclination and the method of calculating the relative inclination have been described above, a detailed description thereof will be skipped. The relative inclination calculator 13 transmits the calculated relative inclination to the graphic user interface magnification processor 14.

Subsequently, the graphic user interface magnification processor 14 determines the magnification direction of the first type interface 100 based on the relative inclination received from the relative inclination calculator 13 (S30). That is, according to the user's gaze direction, it is determined whether the first type interface 100 is magnified in the longitudinal direction or the horizontal direction. Since the determination of such a magnification direction has been described above, detailed description thereof will be skipped here. In the embodiment described above, the determination of the magnification direction S30 is performed by the graphic user interface magnification processor 14, but it may also be performed by the relative inclination calculator 13. In this case, the relative inclination calculator 13 transmits the calculated relative inclination and the magnification direction to the graphic user interface magnification processor 14.

The graphic user interface magnification processor 14 determines the magnification ratio M of the first type graphic user interface 100 based on the relative inclination (S40). As described above, the magnification M is preferably determined such that the size $l_0$ of the first type graphic user interface 100 observed at the sensed user's eye position is similar to the original size $l_0$. In addition, the magnification M may be determined using the LUT where values determined by an experiment, mathematical formula or simulation are stored, or using a predetermined calculation formula. The details of the determination of the magnification ratio are the same as described above.

The graphic user interface magnification processor 14 determines an area, i.e., a magnified display area MA in which the magnified first type graphic user interface is to be displayed, based on the relative inclination and the magnification direction (S50). The magnified display area MA is preferably set to an area closer to the user. Since the determination of the magnified display area MA has been described above, the detailed description is skipped here.

Finally, the graphic user interface magnification processor 14 magnifies the length in the magnification direction of the first type graphic user interface 100 by applying the determined magnification ratio, and displays the magnified first type graphic user interface 100 in the determined magnified display area MA. At this time, the graphic user interface magnification processor 14 determines whether there is a second type graphic user interface that is not a magnified object in the magnified display area MA, and according to the determination result, deactivates and/or stops displaying the second type graphic user interface in the magnified display area MA, as described above. Since the process of displaying the magnified first type graphic user interface 100 in the magnified display area MA has been described above, a detailed description thereof will be skipped.

In this manner, the features, functions, processes, etc., described herein may be implemented via software, hardware, firmware, or any combination thereof. If implemented in software, the functions may be stored as one or more instructions on a non-transitory computer readable medium or non-transitory processor-readable medium. The various steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include random access memory (RAM), read only memory (ROM), electrically erasable programmable read only memory (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

In the present disclosure, a "unit" or "-or" or "-er" may refer to a hardware based unit, a software based unit or a combination of hardware and software. The hardware based unit may include self-contained components such as chipsets, specialized circuitry and one or more memory devices, while the software-based unit may be part of a program code or linked to the program code containing specific programed instructions, which may be loaded in memory. The "unit" or "-or" or "-er" (whether hardware, software, or a combination thereof) may be designed to implement or execute one or more particular functions or routines.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A mobile device comprising: a display panel configured to display a plurality of graphic user interfaces including one or more size-changeable graphic user interfaces and one or more size-unchangeable graphic user interfaces; one or more sensors configured to detect a position of a user's eye; and one or more processors configured to: calculate a relative inclination of the display panel with respect to the position of the user's eye based on the position of the user's eye detected by the one or more sensors, calculate a magnification ratio based on the relative inclination of the display panel; and control the display panel to magnify the one or more size-changeable graphic user interfaces by multiplying an original size of one or more size-changeable graphic user interfaces by the magnification ratio.

2. The mobile device of claim 1, wherein the one or more processors is configured to calculate an angle θ between a first line and a second line as the relative inclination,
wherein the first line is a line connecting a predetermined position of the display panel and the position of the user's eye, and the second line is perpendicular to a surface of the display panel.

3. The mobile device of claim 2, wherein the one or more processors is configured to calculate the magnification ratio using a formula M=1/cos θ, wherein M is the magnification ratio.

4. The mobile device of claim 1, wherein the one or more processors are configured to:
when the relative inclination of the display panel with respect to the position of the user's eye is out of a predetermined threshold range, calculate the magnification ratio based on the relative inclination of the display panel so that the size of the one or more size-changeable graphic user interfaces is changed in proportion to the relative inclination of the display panel, and
when the relative inclination of the display panel with respect to the position of the user's eye is within the predetermined threshold range, set the magnification ratio 1.

5. The mobile device of claim 1, wherein:
setting regarding whether each of the plurality of graphic user interfaces is size-changeable or size-unchangeable is stored in a memory, and
the one or more processors are configured to magnify the sizes of the one or more size-changeable graphic user interfaces according to the relative inclination of the display panel and the stored setting regarding whether each of the plurality of graphic user interfaces is size-changeable or size-unchangeable.

6. The mobile device of claim 1, wherein the one or more processors are configured to:
determine, based on the relative inclination of the display panel, a magnification display area on which the one or more size-changeable graphic user interfaces are to be displayed,
when the relative inclination of the display panel with respect to the position of the user's eye is out of a predetermined threshold range and at least a portion of the one or more size-unchangeable user interfaces are displayed on the magnification display area, replace the at least a portion of the one or more size-unchangeable user interfaces with the magnified one or more size-changeable user interfaces.

7. The mobile device of claim 1, wherein the one or more processors are configured to:
determine a magnification display area on which the one or more size-changeable user interfaces are to be displayed, based on the relative inclination of the display panel,
when the relative inclination of the display panel with respect to the position of the user's eye is out of a predetermined threshold range, determine whether at least a portion of the one or more size-unchangeable graphic user interfaces is displayed on the magnification display area,
deactivate the one or more size-unchangeable graphic user interfaces, displayed on the magnification display area, and
display the one or more size-changeable graphic user interfaces on the magnification display area by overlaying the one or more size-unchangeable graphic user interfaces, displayed on the magnification display area, with the one or more size-changeable graphic user interfaces.

8. The mobile device of claim 7, wherein the one or more processors are configured to, when the relative inclination of the display panel with respect to the position of the user's eye is within the predetermined threshold range, restore the one or more size-unchangeable graphic user interfaces, replaced with the one or more size-changeable graphic user interfaces, to the magnification display area.

9. The mobile device of claim 1, wherein the one or more processors are configured to control the display panel to locate the size-changed one or more size-changeable graphic user interface at a position of the display panel which is closest to the position of the user's eye.

10. A method for adaptively magnifying a graphic user interface, the method performed by a mobile device comprising a display panel, one or more sensors and one or more processors, the method comprising: displaying, by the display panel, a plurality of graphic user interfaces including one or more size-changeable graphic user interfaces and one or more size-unchangeable graphic user interfaces; detecting a position of a user's eye by the one or more sensors; receiving, by the one or more processors, the position of the user's eye from the one or more sensors and calculating, by the one or more processors, a relative inclination of the display panel with respect to the position of the user's eye based on the position of the user's eye detected by the one or more sensors; calculating, by the one or more processors, a magnification ratio based on the relative inclination of the display panel; and controlling, by the one or more processors, the display panel to magnify the one or more size-changeable graphic user interfaces by multiplying an original size of one or more size-changeable graphic user interfaces by the magnification ratio.

11. The method according to claim 10, wherein the relative inclination is an angle θ between a first line and a second line as the relative inclination,
wherein the first line is a line connecting a predetermined position of the display panel and the position of the user's eye, and the second line is perpendicular to a surface of the display panel.

12. The method according to claim 11, wherein the magnification ratio is calculated using a formula M=1/cos θ, wherein M is the magnification ratio.

13. The method according to claim 10, wherein setting regarding whether each of the plurality of graphic user interfaces is size-changeable or size-unchangeable is stored in a memory.

14. The method of claim 10, wherein controlling the display panel comprises:
determining a magnification display area on which the one or more size-changeable graphic user interfaces are to be displayed, based on the relative inclination of the display panel;

magnifying the one or more size-changeable graphic user interfaces according to the relative inclination of the display panel; and displaying the magnified one or more size-changeable graphical user interfaces on the magnification display area.

15. The method according to claim 10, further comprising:

when the relative inclination of the display panel with respect to the position of the user's eye is out of a predetermined threshold range, calculating the magnification ratio based on the relative inclination of the display panel so that the size of the one or more size-changeable graphic user interfaces is changed in proportion to the relative inclination of the display panel, and when the relative inclination of the display panel with respect to the position of the user's eye is within the predetermined threshold range, setting the magnification ratio 1.

16. The method of claim 10, further comprising:

determining, based on the relative inclination of the display panel, a magnification display area on which the one or more size-changeable graphic user interfaces are to be displayed;

when the relative inclination of the display panel with respect to the position of the user's eye is out of a predetermined threshold range and at least a portion of the one or more size-unchangeable user interfaces is displayed on the magnification display area, replacing the at least a portion of the one or more size-unchangeable user interfaces with the magnified one or more size-changeable user interfaces.

17. The method of claim 10, further comprising:

determining a magnification display area on which the one or more size-changeable user interfaces are to be displayed, based on the relative inclination of the display panel;

when the relative inclination of the display panel with respect to the position of the user's eye is out of a predetermined threshold range, determining whether at least a portion of the one or more size-unchangeable graphic user interfaces is displayed on the magnification display area, deactivating the one or more size-unchangeable graphic user interfaces, displayed on the magnification display area, and displaying the one or more size-changeable graphic user interfaces on the magnification display area by overlaying the one or more size-unchangeable graphic user interfaces, displayed on the magnification display area, with the magnified one or more size-changeable graphic user interfaces.

18. The method of claim 10, further comprising controlling the display panel to locate the size-changed one or more size-changeable graphic user interface at a position of the display panel which is closest to the position of the user's eye.

* * * * *